United States Patent [19]

Maclin

[11] Patent Number: 4,921,509
[45] Date of Patent: May 1, 1990

[54] AIR FILTRATION SYSTEM FOR DUCTED RANGE HOODS

[75] Inventor: Austin Maclin, Middleton, Mass.

[73] Assignee: Micro-Technology Licensing Corporation, Tequesta, Fla.

[21] Appl. No.: 236,945

[22] Filed: Aug. 26, 1988

Related U.S. Application Data

[63] Continuation of Ser. No. 114,778, Oct. 30, 1987, abandoned.

[51] Int. Cl.$^5$ .......................... B03C 3/66; B03C 3/72
[52] U.S. Cl. ........................................ 55/104; 55/106; 55/126; 55/213; 55/274; 55/320; 55/341.6; 55/472; 55/500; 55/DIG. 36
[58] Field of Search ................. 55/104, 106, 126, 213, 55/215, 274, 318, 320, 328, 335, 472, 473, 478, 500, DIG. 36, 341.6; 98/115.3

[56] References Cited

U.S. PATENT DOCUMENTS

| | | | |
|---|---|---|---|
| 3,263,403 | 8/1966 | Ladusaw | 55/274 |
| 3,886,854 | 6/1975 | Culpepper | 55/126 X |
| 3,924,605 | 12/1975 | Weinman et al. | 55/213 X |
| 4,040,042 | 8/1977 | Mayer | 55/274 X |
| 4,056,375 | 11/1977 | Ringel et al. | 55/381 |
| 4,552,058 | 11/1985 | Wooldridge | 55/215 X |
| 4,655,049 | 4/1987 | Andrews et al. | 55/213 X |
| 4,786,295 | 11/1988 | Newman et al. | 55/213 |

Primary Examiner—Charles Hart
Attorney, Agent, or Firm—Felfe & Lynch

[57] ABSTRACT

An air filtration system for removing smoke and grease from cooking exhaust of ducted range hoods is disclosed. In particular, the system includes a coarse filter device fine filter device which substantially remove all of the cooking effluents from the cooking exhaust drawn into the system by a fan powered by a variable speed motor. A sail switch device is connected to the motor and is positioned in the system to determine the flow quantity of the air drawn into the system and to maintain this flow quantity at a substantially constant volume by controlling the speed of the motor device. A maximum speed of the motor is determined by an indicator device signaling an operator to change filters clogged with cooking particles.

6 Claims, 1 Drawing Sheet

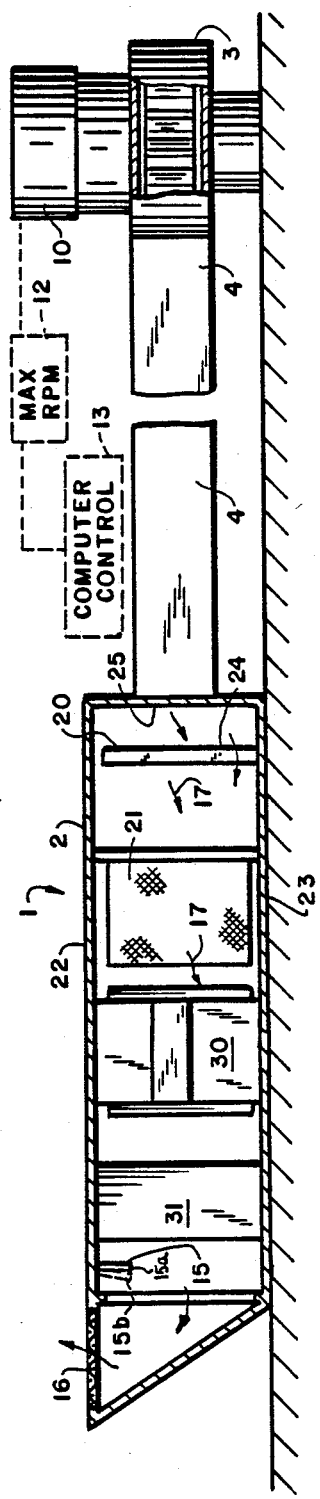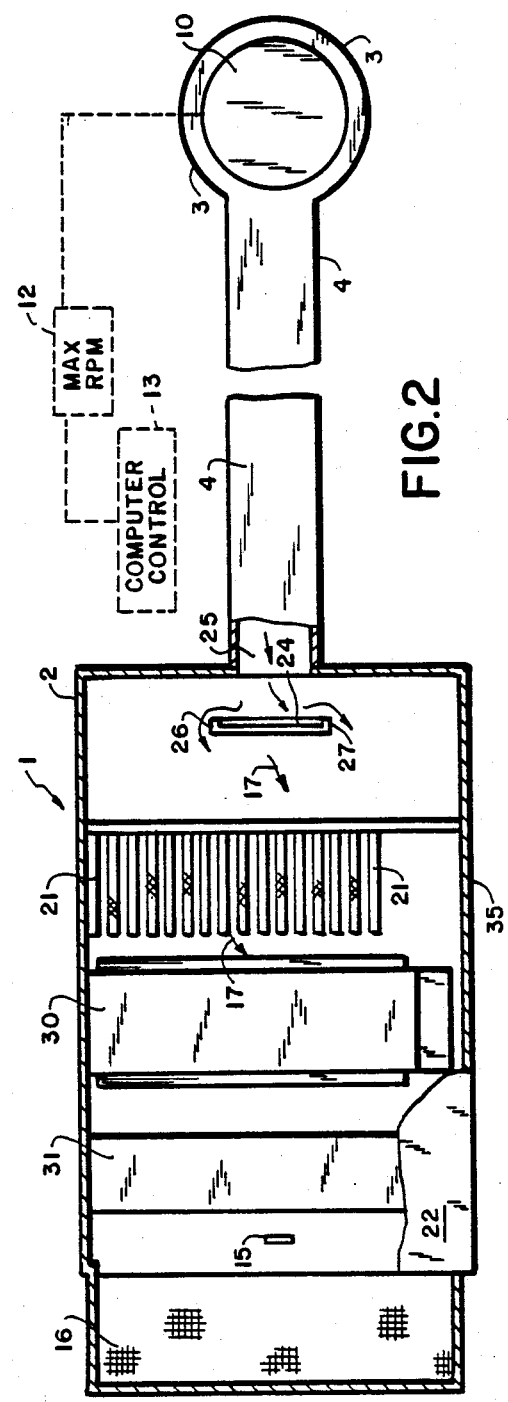

AIR FILTRATION SYSTEM FOR DUCTED RANGE HOODS

This is a continuation application of application Ser. No. 114,778, filed Oct. 30, 1987 and now abandoned.

FIELD OF THE INVENTION

This invention relates to a air filtration system for filtering cooking effluents from the exhaust above cooking units in a ducted range hood.

BACKGROUND OF THE INVENTION

It has long been a problem in commercial kitchens to remove the smoke, grease and odors generated above the cooking units. This problem has been addressed in both duct and ductless hoods positioned above the cooking ranges, grills and deep fat fryers. In a ductless system, the cooking discharges are passed through a filter and the filtered air returned to the kitchen. Although such systems may pass a sufficient volume of air for effective filtration, they must be designed within critical dimensions.

Therefore, ducted systems are often preferred for exhausting cooking discharges through a series of filters and out into the atmosphere.

Prior art exhaust systems for such systems generally include exhaust hoods located over a cooking area, a series of grease removal filters mounted in these hoods and a hood exhaust fan, usually located on the roof. The filters in the hoods are highly inefficient since they are designed to remove only the largest grease particles from the cooking exhaust, and there is no means provided in these filters for removing smoke or odors from the exhausted air.

Hood exhaust fans generally employed in the known systems are of a centrifugal up-blast which move the air stream through the filters and discharge it vertically into the atmosphere. Such fans depend on wind currents to carry away the smoke, odors and grease laden air.

Local rules which concern regulation of restaurant exhaust vary from place to place, and it is generally illegal to discharge cooking effluents into the atmosphere which adversely affect the environment. Furthermore, many fire regulations are addressing the problem of grease build-up which develops on the roof around the hood exhaust fan.

It is therefore an object of this invention to substantially eliminate all of the particles from exhaust cooking air and to further eliminate the grease build-up associated with exhaust fans known in the prior art.

Additionally, many of the prior art systems are balanced when they are installed to assure that a proper amount of air is exhausted from the cooking area and that this air is matched with an appropriate amount of make-up air to guarantee the elimination of a smoke build-up around the cooking areas. In general, this make-up air consists of either air conditioning or heating, depending on the season, regulated in the commercial establishment.

As the prior art systems are operated, grease builds up on filters, exhaust ducts and exhaust fan blades, reducing the amount of air that can be exhausted from the cooking area. Although these filters and exhaust ducts can be cleaned, generally cleaning does not keep up with the grease build-up and nothing is done regarding the build-up of grease on the exhaust fan blades. An improper air balance eventually results in these systems, and the proportion of make-up air to exhaust air is unbalanced. When more air is exhausted than the amount of make-up air in the area, a vacuum is created, conversely when less exhaust than make-up air is present, entrances to the area (e.g., doors and windows) bulge. A drain on the energy systems of the establishment thus occurs and the system becomes unbalanced, inefficient and costly.

It is therefore another object of the inventive system to substantially filter all of the smoke and grease from the cooking exhaust prior to releasing it into the surrounding atmosphere.

It is further an object to control the flow quantity of the cooking exhaust through the inventive system to thus maintain a constant air flow and provide a balanced and more cost effective air filtration system.

SUMMARY OF THE INVENTION

The objects described above and others which will become obvious to those skilled in the art are achieved by the inventive air filtration system having a series of coarse and fine particle removing filters arranged between an inlet and an outlet of the system. Cooking exhaust is drawn into and through the system from a cooking area by means of a fan powered by a variable speed motor. A sail switch means monitors the flow quantity of the air as it is forced through the system to control the speed of the motor within a control range and to maintain a constant volume of this air.

Specifically, as grease and other particles build-up in the filters, the flow quantity of the exhaust air is decreased, and this change is determined by the sail switch mechanism. The switch in turn increases the speed of the motor through a computer control system until a maximum motor speed is reached to maintain a constant flow of the air flow quantity. A maximum speed of the motor is indicated by an indicator means, preferably a light indicator, which is monitored by an operator to determine when filters in the system are clogged and need to be replaced or cleaned.

BRIEF DESCRIPTION OF THE DRAWINGS

FIG. 1 is a diagrammatic cross section through the inventive air filtration system.

FIG. 2 is a top planar view of the inventive air filtration system.

DETAILED DESCRIPTION OF THE INVENTION

The inventive system 1 is attached to a ducted range hood (not shown) preferably on the roof of the building and is preferably housed in a metal housing 2 as illustrated in FIG. 1. Materials which may be employed for the housing 2 include aluminum, aluminum alloys or any other non-corrosive or protected metals known in the art.

The inlet 4 of the system is attached to ducts from the range hood. A fan 3 powered by a variable speed motor 10, which is preferably of the type known in the art as a "smart" fan, is located near the inlet 4 of the housing as illustrated in FIG. 1 in such a manner that exhaust air 17 containing cooking effluents is drawn into the filtration system and pushed by the fan's blades into and through the system 1.

The fan 3 is preferably positioned near the inlet 4 to force exhaust air 17 through the system. If the fan 3 were positioned to pull the exhaust 17 rather than push it through the system, any leaks around doors or joints would need to be airtight to prevent a substantial influx of outside air and particles into the system. Additionally, any leaks in the system would not be detected by the sail switch and an accurate determination of the exhaust air 17 through the system would not be made.

The variable speed motor 10 may be of any type known in the art for producing a range of speeds at which to operate the fan 3 and is preferably positioned near the fan 3 at the inlet 4 of the system.

An indicator means 12 is connected to the motor 10 means for determining a maximum speed of the motor 10. Preferably, the indicator means is a light indicator which is turned on when a maximum motor speed is reached. This indicator means 12 is positioned in the cooking area so that it is easily observed by an operator.

Additionally, the motor 10 may be connected to a computer control unit 13 which may be used to control the operation of the filtration device as diagrammatically illustrated in FIG. 1.

A sail switch 15 is positioned near the outlet 16 of the system and controls the speed of the fan 3 and motor 10 by any means known in the art. Preferably the sail switch 15 is connected to the computer control 13 and signals from the control regulate the motor's speed.

The sail switch 15 determines a flow quantity of the exhaust air 17 as it moves from the inlet 4 toward the outlet 16 of the system 1 by detecting its velocity. The velocity measurement may be multiplied by the square footage of an area of the system to provide the volume of exhaust air throughout the system. As the exhaust air 17 passes through filters of the system, effluents or particles are filtered out of the air and its velocity is lessened by the build-up of particles on the filters. As the velocity decreases, the sail switch 15 moves from a substantially inclined position 15b (shown in phantom lines) to a more vertical position 15a and a signal generated from the computer control 13 increases the motor speed within a control range up to the maximum motor speed.

Flow quantity of the exhaust air is defined as a volume of air flowing through the system 1 at a velocity of at least 1500 ft/min. through the duct work. As the filters in the system clog with entrapped grease and other particles, both the velocity of the air flow and its volume decrease to subsequently decrease its flow quantity. The decreased flow quantity as it moves from a substantially inclined position 15b (shown in phantom lines in FIG. 1) to a more vertical position 15a thus increase the speed control means of the motor up to a maximum speed. The preferred speed ranges of the motor are 1725 to 3450 rpm.

The filter system is generally divided into a coarse filter system and a fine filter system. The coarse filter system filters out the coarse grease particles, such as grease spatters, while the fine system removes fine particles such as smoke and may also remove noxious gases such as nitrogen oxides and carbon monoxides produced in cooking systems The coarse filter means includes an impingement plate 20 and preferably an oil mist bag 21 as illustrated in FIG. 1. The impingement plate 20 is preferably made of metal such as aluminum and is positioned in the system near the inlet 4. The plate extends from the top 22 to the bottom 23 of the housing 2 and has a surface area 24 at least as large as a surface area 25 of the inlet 4.

When air exhaust 17 is forced into the system through the inlet 4 by means of the motor driven fan 3, it initially strikes the impingement plate 20 which serves to dispurse the air path around the plate sides 26, 27. Any large particles or spatters in the air flow 17 may fall to the bottom 23 of the housing accommodating the impingement plate.

Diverted air traveling around the edges 26, 27 of the plate 20 continues its flow into the oil mist bag filter 21. The diverted air 17 will enter the filter 21 at both its side sections as well as the center sections to ensure that the entire area of the filter 21 is uniformly used prolonging the life and efficiency of the filter 21. This filter bag 21 is preferably constructed with a large area space preferably having accordion pleats as illustrated in FIG. 2. The oil bag 21 is preferably of a high loft material such as felted fabrics, woven fabrics or non-woven fabrics of polypropylene, polyethylene, etc. It may be appreciated that any high loft, large area material may be used for construction of the filter bag 21.

Oil mist bag filters which may be employed include those disclosed in U.S. Pat. No. 4,056,375 owned by Firma Carl Freudenberg of the Federal Republic of Germany and issued on Nov. 1, 1977.

The oil bag filters remove approximately 75-80% of the particle matter including carbon, dust, grease, cooking oil, etc.

The fine filter means includes an electronic section 30 and a filter section 31.

The electronic section 30 is preferably an electronic metal filter with a plurality of metal sections which are electrified to create a polarity from one end of the section to another. These sections are preferably arranged in a series and mounted vertically from the top 22 to the bottom 23 of the system so that collected particulate material can drop off into the bottom of the system. It is in this section, that most of the noxious odors are removed from the air flow. In the preferred electronic section, particles down to at least 0.03 micron in size are removed, and at least 70% of the smoke particles are captured and removed.

HEPA filters 31 are high efficiency particle arrestors known in the art and often employed in areas requiring sterile conditions, such as operating rooms. Such a filter is positioned behind the electronic section 30 and in front of the sail switch 15 to scrub the air flow 17 of any remaining particles or cooking effluents. The air flow 17, drawn from the HEPA filter section 31 past the sail switch 15 and exiting through the outlet 16, is substantially free of all cooking particles, smoke or odor.

One side 35 of the system 1 is preferably removably attached to the housing by any means known in the art so it can be removed for easy access to the filter means for maintenance or repair.

In another preferred embodiment, another filter section may be included in this system between the electronic section 30 and the HEPA filter section 31 to remove any odors which have not been previously removed by the other filters. Such a section may include materials that remove odors such as charcoal, silicon gel and non-woven materials, etc. This section is optional as most of the odors are removed in the device by means of the coarse and fine filters described above.

The preferred embodiment described above achieves the objects of the invention; however, it will be appreciated that departures can be made by those skilled in the art without departing from the spirit and scope of the invention which is limited only by the following claims.

I claim:

1. An air filtration system for ducted range hoods comprising:

(a) a housing having an inlet and an outlet;

(b) motor means having a variable speed range and attached to said housing (c) a fan attached to said housing near said motor means and driven by said motor means for forcing air containing cooking effluents through said air filtration system;

(d) an air impingement plate having a surface area larger than a surface area of said inlet and positioned behind said inlet in said housing;

(e) an oil mist filter bag system having a high loft surface area positioned between said impingement plate and said outlet in said housing to remove coarse cooking effluents from the air drawn through said system;

(f) an electronic filter section means positioned between said oil mist bag filter system and said outlet of the housing for causing an electrostatic action to remove fine particles from the cooling effluent of the air drawn through the system;

(g) a high efficiency particle arrestor filter section means positioned between said electronic filter section and said outlet for removing substantially all of said fine particles from the cooking effluent of the air drawn through the system;

(h) sail switch means positioned between said high efficiency arrestor filter section means and said outlet of the housing, said sail switch means controlling the variable speed of said motor means whereby said flow quantity of said air is maintained at a substantially constant volume within a control range of said motor means; and (i) indicator means attached to said motor means for indicating a maximum speed of said motor means.

2. The air filtration system according to claim 1 wherein said sail switch means comprises a sail switch determining the flow quantity of said forced air and increasing the variable speed of said motor means, thereby increasing the variable speed of said motor means as said flow quantity decreases.

3. The air filtration system according to claim 1 wherein said indicator means is attached to said motor means for visually indicating a maximum speed of said motor means during operation of the system when said flow quantity is sufficiently decreased.

4. The air filtration according to claim 1 wherein said housing further comprises a removable side section positioned between said inlet and said outlet of the housing.

5. An air filtration exhaust system for cooking effluents comprising:

a filter bag exhaust system having a surface area positioned to remove coarse cooking effluents from exhaust air flowing through said system;

an electronic filter section exhaust means positioned after said filter bag system in the direction of flow of exhaust air flowing through the filtration system for causing an electrostatic action to remove fine particles from the cooking effluent of the exhaust air flowing through the filtration system;

a high efficiency particle arrestor filter section exhaust means positioned after said electronic filter section in the direction of flow of exhaust air flowing through the filtration system for removing substantially all of said fine particles from the cooking effluent of the air flowing through the filtration system;

exhaust means preceding said filter bag exhaust system in the direction of exhaust air flow through the filtration system for developing an exhaust air-driving force for forcing air containing a cooking effluent through the filtration system;

an impingement plate positioned between said exhaust means and said filter bag exhaust system; and means responsive to the velocity of exhaust air forced through the filtration system for controlling said exhaust airforcing means to increase the air-driving force when the velocity of exhaust air forced through the filtration system decreases.

6. An air filtration system for cooking effluents in accordance with claim 5 in which said filter bag system is an oil mist filter bag system.

* * * * *

UNITED STATES PATENT AND TRADEMARK OFFICE
CERTIFICATE OF CORRECTION

PATENT NO. :

DATED : 4,921,509

INVENTOR(S) : May 1, 1990

Austin Maclin

It is certified that error appears in the above-identified patent and that said Letters Patent is hereby corrected as shown below:

Column 4, line 25 for "and a filter" read

-- and a HEPA filter --.

Signed and Sealed this

Fourth Day of February, 1992

*Attest:*

HARRY F. MANBECK, JR.

*Attesting Officer*     *Commissioner of Patents and Trademarks*